United States Patent [19]

Flaig

[11] Patent Number: 4,520,998

[45] Date of Patent: Jun. 4, 1985

[54] SAFETY MECHANISM FOR A HOIST

[75] Inventor: Heinz Flaig, Bochum, Fed. Rep. of Germany

[73] Assignee: Mannesmann Aktiengesellschaft, Dusseldorf, Fed. Rep. of Germany

[21] Appl. No.: 647,026

[22] Filed: Sep. 4, 1984

Related U.S. Application Data

[63] Continuation of Ser. No. 413,694, Sep. 1, 1982, abandoned.

[30] Foreign Application Priority Data

Sep. 22, 1981 [DE] Fed. Rep. of Germany ....... 3137523

[51] Int. Cl.$^3$ ......................... B66D 5/04; F16D 65/10

[52] U.S. Cl. .................................... 254/267; 254/376; 242/99; 188/185; 188/218 A

[58] Field of Search ............... 254/366, 376, 378, 267; 242/84.52 C, 99, 107.3; 182/234, 239; 188/184–189, 218 A, 71.1, 340

[56] References Cited

U.S. PATENT DOCUMENTS

| | | | |
|---|---|---|---|
| 2,546,202 | 3/1951 | Trouin | 242/107.3 |
| 3,901,478 | 8/1975 | Peterson | 254/366 X |
| 4,058,271 | 11/1977 | Ubukata et al. | 242/107.4 B |

FOREIGN PATENT DOCUMENTS

| | | | |
|---|---|---|---|
| 1300326 | 7/1969 | Fed. Rep. of Germany . | |
| 2301113 | 7/1973 | Fed. Rep. of Germany . | |
| 2907111 | 9/1979 | Fed. Rep. of Germany | 254/378 |
| 425817 | 8/1912 | France | 188/184 |

OTHER PUBLICATIONS

German Reference DE–OS 19 85 283, issue 19 from May 9, 1968, p. 1162.

*Primary Examiner*—Stuart S. Levy
*Assistant Examiner*—Joseph J. Hail, III
*Attorney, Agent, or Firm*—Mandeville and Schweitzer

[57] ABSTRACT

A cam following roller is one arm while a latching member is the other arm of a two-armed lever. The roller rides on the surface of a cam disk. The latch is supported by a spring in a released position relative to the stopping points of the sprocket as long as the predetermined speed limit of lowering a hoist is not exceeded. The sprocket is formed of two segments which are releasably connected with each other by screws. Brake pressure springs are arranged in the shape of a cup-spring package between the screw head and support surfaces of the sprocket segments.

When the lowering speed of the hoist is exceeded, the latch is pressed into one of the stopping points of the sprocket, said sprocket arresting, by way of a brake lining, the brake drum and the cable drum connected therewith. In order to lower the load, one of the screws is slowly released and the contact pressure of the segments and of the sprocket with its glued-on brake lining on the brake drum slowly relaxes, such that the frictional resistance of the brake lining is slowly overcome. The heat generated during the braking process leads to an expansion of the brake drum and, thereby, again to increased braking, possibly again up to the point of arrest of the lowering motion. By again slowly releasing the screws holding the sprocket segments together, the load may be easily controlled and safely brought down.

4 Claims, 2 Drawing Figures

SAFETY MECHANISM FOR A HOIST

This is a continuation application of application Ser. No. 413,694, filed Sept. 1, 1982, now abandoned.

BACKGROUND OF THE INVENTION AND DESCRIPTION OF THE PRIOR ART

The present invention is directed to a safety mechanism for a hoist having a responsive lowering speed limit which is activated in case overly elevated lowering speeds are reached. If the maximum predetermined lowering limit is exceeded, a latch locks into a stopping point of a sprocket which, itself, rotates along with the cable drum of the hoist, thereby stopping the lowering operation of the hoist.

A safety mechanism is shown in German reference 1,985,283 which, after being activated, causes the load to be lowered at moderate speed. The device shown therein has the cable glide around the cable disk while braking. This arrangement has the disadvantage that the lowering speed, depending on the load and on the surface condition of the cable, is not able to be regulated with any degree of precision. Furthermore, the load is lowered, albeit at a slower speed, immediately subsequent to the activation of the safety mechanism, i.e., even when an immediate lowering is not desirable and when persons may be endangered thereby.

SUMMARY OF THE INVENTION

It is, therefore, an object of the present invention to design a safety mechanism such that if the lowering speed is exceeded and the safety mechanism activated, the load may be lowered at a selected, desirable time and under controlled conditions. This problem is solved by the present invention in that a sprocket comprises a brake ring formed by a plurality of segments releasably connected with each other by screws. A brake lining is present between the connected together segments and the brake drum is connected to the cable drum. Subsequent to the activation of the safety mechanism, the latch will drop into receiving slots of the sprocket and cause the brake ring and the brake lining to assert a dragging arrest on the brake drum and, thereby, also on the cable drum. It is then that the operators or repairmen can properly, at the time desired, prepare the load for lowering at a later time, if desired, so that no persons or objects are at risk. For the active lowering activity, one of the screws is released which reduces the contacting force of the brake ring on the brake drum to the extent that the brake drum will then rotate through the downward pulling force of the load. As the screw is slowly released, the pressure on the brake drum relaxes slowly, and the frictional resistance of the brake lining on the cable drum is slowly overcome. The heat generated during the braking action leads to an expansion of the brake drum and, thereby, again to increased braking, possibly again up to the point of arrest of the lowering motion. By releasing the screw further, the load may be precisely controlled and safely deposited at a time selected by the operator.

The mentioned brake ring is preferably formed of three segments and, in addition, comprises the inner surface of the sprocket. The brake drum may be part of the cable drum or connected with it for the safety mechanism to be activated even in cases of damage to the gearing of the brake motor. The brake drum may be provided with an annular tee-slot to guide the brake ring with its brake lining, adjacent to which sealing rings may be arranged.

In a further development of the present invention, brake pressure springs, in the shape of cup springs, are arranged between the heads of the screws or, if applicable, nuts and their support surfaces located on the segments of the sprocket. The cup springs allow for a particularly sensitive release of the screws and, thereby, a predetermined gradual relaxing of the brake pressure, as desired.

In yet another development of the present invention, a brake release device is arranged at the sprocket. The release device may consist of some type of fail-recognition electronics with electro-magnets which respond either to every stoppage of the hoist or to the lowering of the hoist exceeding the maximum limit speed or to the lowering of the hoist being shorter in time than the normal operating brake time. The brake release device may be connected with an indicator device serving to emit an alarming optical or acoustical signal. The indicator device, in whatever form, may be located at an operating control stand, particularly in the case of a remote-controlled hoist mechanism.

According to yet another characteristic of the present invention, a roller element rides on a camming surface of a cam disk. The disk is in contact with the roller by the force of a spring which may be located adjacent to the sprocket. The roller is arranged at one end of a two-armed lever. The other end of the lever, pivotal by way of a centrally located bolt at the hoist, forms the locking latch. The spring is designed to be strong enough for it to overcome the mass moment of inertia of the two-armed lever, formed of the latch and the roller, but only during the permissible speed of rotation of the sprocket. This means that, in the range of the permissible rotation, the roller is in constant contact with the camming surface of the cam disk, and the latch is guided over each projected edge of the sprocket. At an increased hoist lowering speed, the cam-following roller is flung away from the camming surface of the cam disk, contrary to the force of the spring, and the locking latch meshes with the sprocket and, therewith, stops the rotational motion of the sprocket and drags the brake drum to a stopping point. This event will occur through the design of the cam disk and sprocket even if bearing damage results to the pivot bolt.

An exemplary embodiment of the invention is illustrated in the drawing and explained as follows:

DETAILED DESCRIPTION OF THE DRAWING

Figure 1:
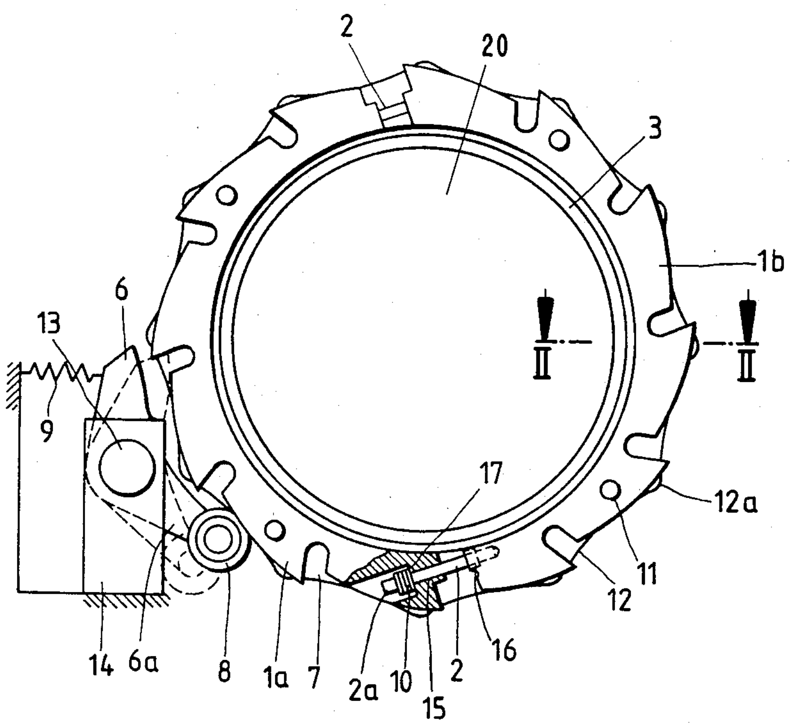
FIG. 1 is a front elevational view of the safety mechanism of the present invention.
Figure 2:
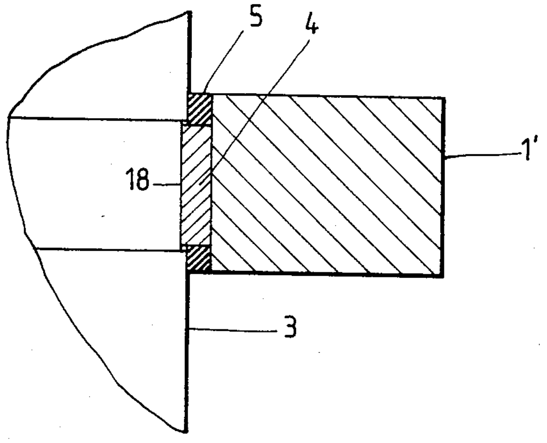
FIG. 2 is a cross sectional view taken along lines II—II of FIG. 1.

In the preferred embodiment of the present invention, a sprocket is formed of two segments 1*a* and 1*b* and connected with each other by screws 2. The segment 1*a* has a screw bore 15 with a support surface 17 for the head 2*a* of a screw 2. The screw 2 is screwed into a threaded bore 16 of the segment 1*b*. Brake pressure springs 10 are arranged, in the shape of a cup-spring package, between the screw head 2*a* and the support surface 17, thereby serving to bias the head of the screw away from threaded bore 16. As one of the screws 2 is slowly released, the contact pressure of the segments 1*a* and 1*b* of the sprocket 1', with its glued-on brake lining 4, relaxes on the brake drum 3, at which it is guided, in an annular tee-slot 18 shown in FIG. 2, with the brake lining 4. Sealers 5, in the form of "O" rings are arranged at both sides of the brake lining 4 as protection against humidity and dust or dirt pollution. The brake drum 3 is merely an extension of a hoisting cable drum 20, not further illustrated.

The segments 1*a* and 1*b* are fastened, by screws 11, to a cam disk 12. These screws are rigid so that they prevent the spreading of the segments 1*a* and 1*b* of the sprocket 1, facing the camming surface of the cam disk 12.

A roller 8 is located at one end of a latching lever 6*a*. Latching member 6 is one end of two-armed lever 6*a*. The roller 8 rolls on the camming surface of cam disk 12, with the latching member 6 supported on a base 14 of the hoist by a pivot bolt 13. The latch 6 is supported by a spring 9, which is loaded under tension to pull latching lever 6 away from sprocket 1. This, in addition, causes roller 8 to bear against the camming surface of cam disk 12. The latch 6 is thus held in released position in relation to the stopping slots 7 of the sprocket 1 as long as the permissible maximum speed of rotation of the hoist is not exceeded. The cam disk is designed such that, even in the event of bearing damage at bolt 13, the tip 12*a* of the cam disk 12 pushes the roller 8 and rotates the lever 6*a* such that the latching member 6 lies in the stopping slot 7 of the sprocket 1. The residual thickness of the segments 1*a* and 1*b* is so low due to the extraordinarily deep stopping slots 7 that they behave much like a flexible belt.

It should be understood, of course, that the specific form of the invention herein illustrated and described is intended to be representative only, as certain changes may be made therein without departing from the clear teachings of the disclosure. Accordingly, reference should be made to the following appended claims in determining the full scope of the invention.

I claim:

1. A safety mechanism for ensuring that a cable drum-operated hoist does not operate above a predetermined cable speed limit, comprising:

(a) a brake drum directly connected to the cable drum of the hoist and rotating therewith;
(b) a sprocket surrounding said brake drum;
(c) said sprocket being lined with a brake lining interposed between said brake drum and said sprocket;
(d) said sprocket being fixed to and rotatable with said brake drum by the frictional force exerted by said brake lining on said brake drum;
(e) said sprocket being provided at its periphery with at least one stopping slot;
(f) a latching means insertable into said stopping slot and serving to prevent rotation of said sprocket and said brake drum when the predetermined cable speed limit is exceeded;
(g) said sprocket comprised of at least two connected together segments, said segments being connected and selectively variably adjusted together by selective releasing means with respect to one another comprising screws passing from one of said segments into an adjacent of said segments, such that upon selective removal adjustment of said screws said brake lining is adjustably released from said brake drum;
(h) each of said segments being provided for each of said screws with spring support surfaces and the adjacent of said segments having receiving threads for said screws;
(i) said selective releasing means further comprising brake-pressure springs, located between the heads of said screws and said spring support surfaces; and
(j) said brake lining being protected on both ends, from contamination, by a pair of sealing rings directly interposed between said brake drum and said sprocket and directly adjacent to said brake lining and completely isolating said brake lining from contamination.

2. A safety mechanism as claimed in claim 1, wherein:

(a) said brake drum has an annular tee-slot for maintaining said brake lining about said brake drum.

3. A safety mechanism as claimed in claim 1, wherein said latching means comprises:

(a) a cam disk rotatable with said sprocket, said cam disk being provided with a cam surface;
(b) a cam surface-following roller rideing on said camming surface of said cam disk;
(c) said roller being arranged at one end of a two-armed pivoting lever;
(d) a spring, located adjacent to said sprocket, and serving to cause said roller to ride on said camming surface until said predetermined cable speed limit is exceeded; and
(e) the other end of said lever being a latching member.

4. A safety mechanism as claimed in claim 3, wherein:

(a) said spring is of such strength that it overcomes the mass moment of inertia of said two-armed lever until said sprocket begins to rotate at a speed in excess of said predetermined cable speed limit.

* * * * *